Nov. 11, 1941.  H. T. LAMBERT  2,262,708
BRAKE UNIT
Filed July 29, 1940   3 Sheets-Sheet 1
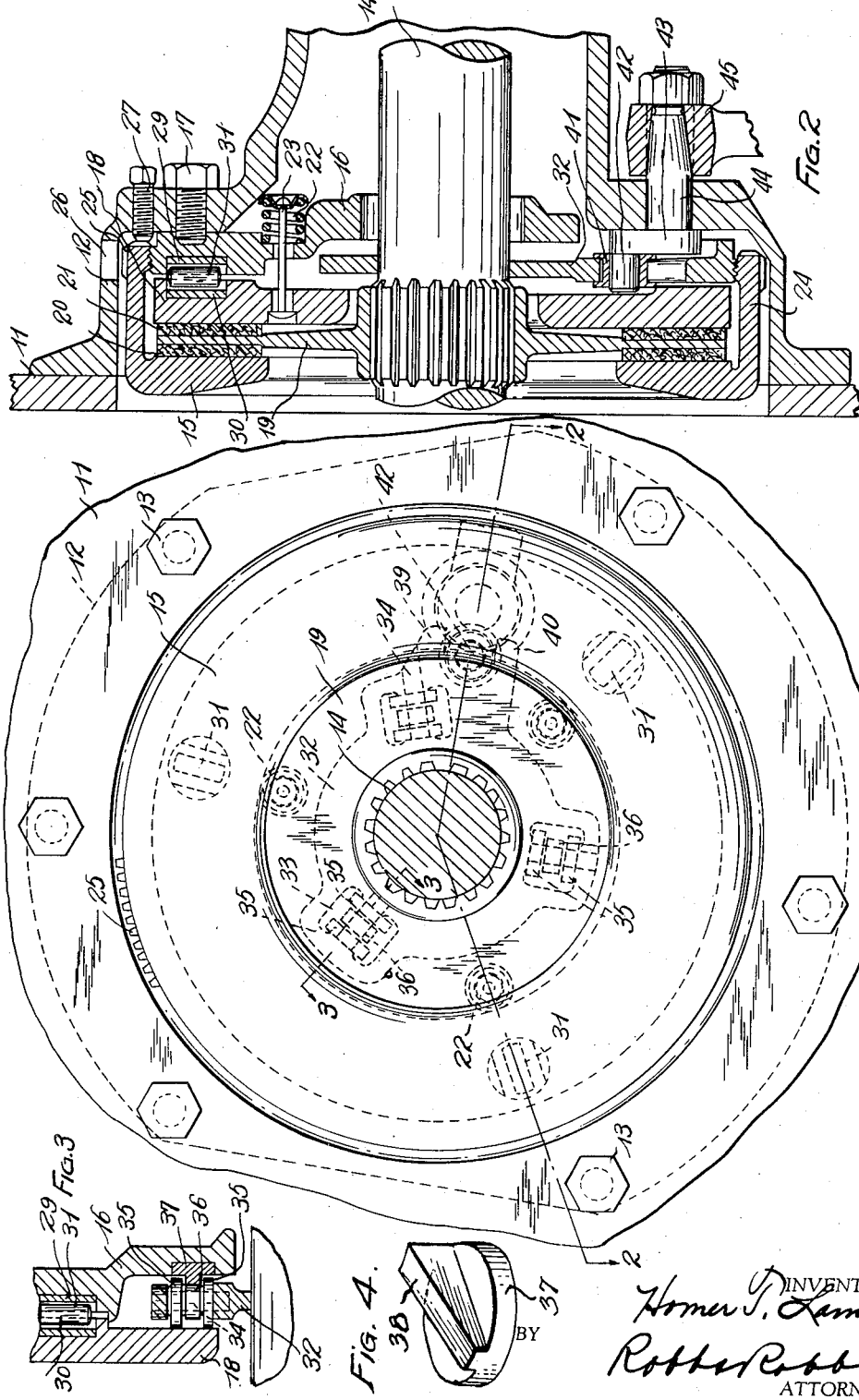
INVENTOR.
Homer T. Lambert
BY
Robert Robb
ATTORNEYS Nov. 11, 1941.　　　H. T. LAMBERT　　　2,262,708
BRAKE UNIT
Filed July 29, 1940　　　3 Sheets-Sheet 2
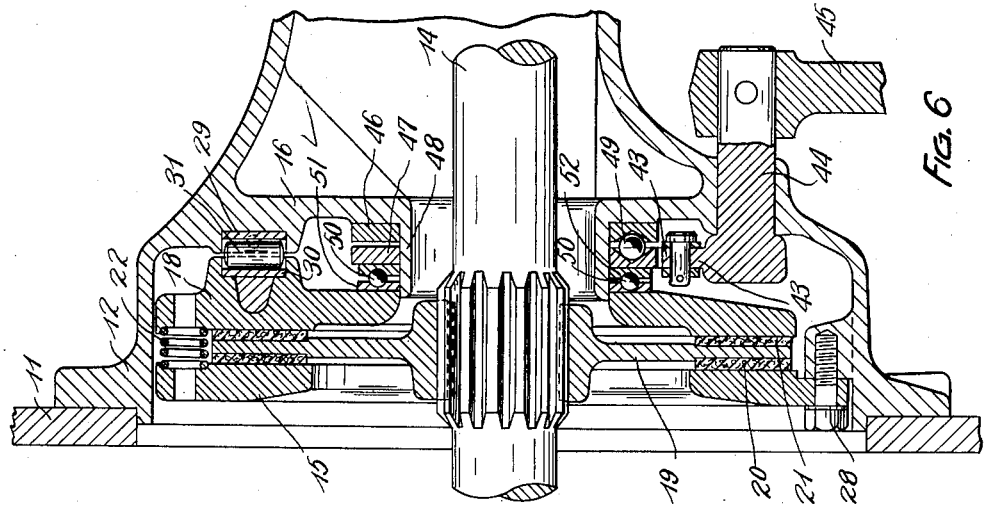
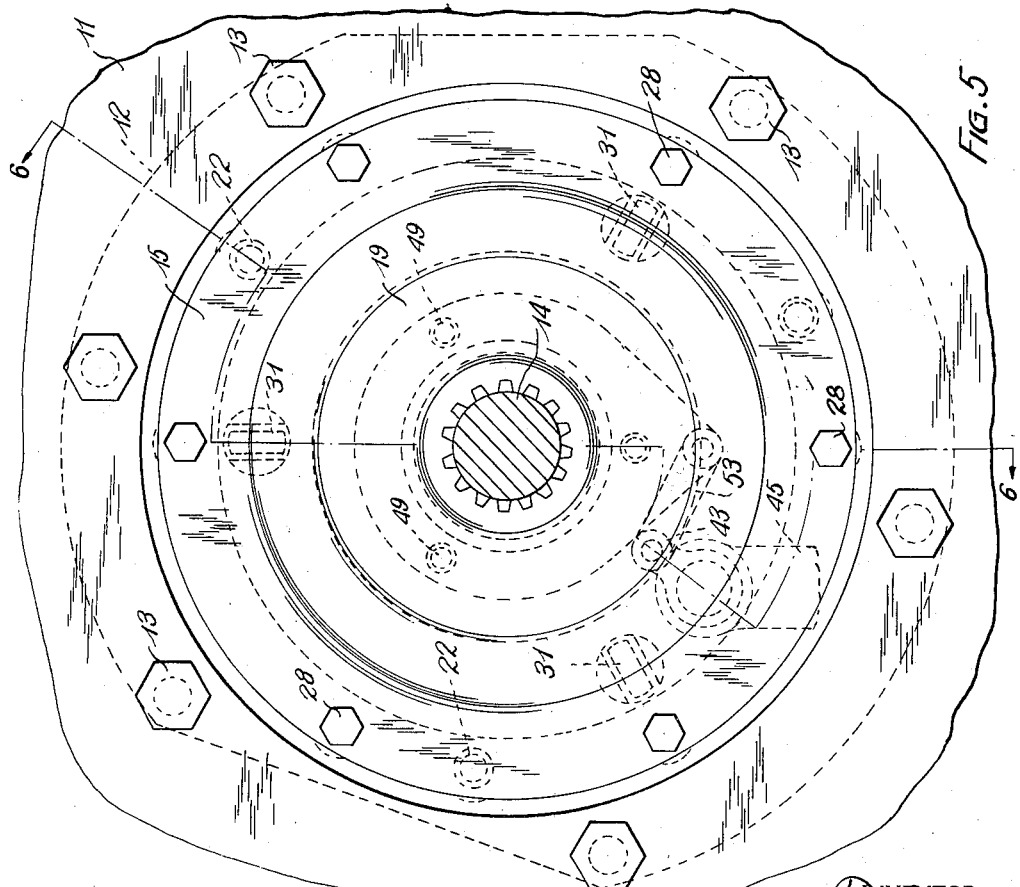
INVENTOR.
Homer T. Lambert
BY
Robb & Robb
ATTORNEYS Nov. 11, 1941.  H. T. LAMBERT  2,262,708

BRAKE UNIT

Filed July 29, 1940  3 Sheets—Sheet 3

INVENTOR.
Homer T. Lambert
BY
Robb & Robb
ATTORNEYS

Patented Nov. 11, 1941

2,262,708

UNITED STATES PATENT OFFICE 2,262,708

BRAKE UNIT

Homer T. Lambert, St. Joseph, Mich.

Application July 29, 1940, Serial No. 348,253

6 Claims. (Cl. 188—72)

This invention relates to improvements in brake constructions of the disc type, and more particularly, to an improved arrangement of operating mechanism for actuating the brake parts to produce a braking action.

One of the principal objects of this invention is to provide, in a brake construction employing relatively stationary and axially movable cooperating brake discs, an improved form of camming mechanism for imparting initial braking action to the axially movable brake disc.

A further object is to provide, in a brake construction of the character referred to employing an axially movable brake applying disc which is relatively rotatable with respect to the housing upon initial brake application, together with self energizing mechanism for building up axial pressure against the brake applying disc, frictionless motion transmitting means for transmitting motion from the operating mechanism to the brake applying disc which will permit free relative rotation of the brake applying disc so as not to interfere with the operation of the self energizing mechanism incident to such relative rotation.

Other objects and advantages of the invention will become apparent during the course of the following description.

In the drawings, like reference characters are employed to indicate like parts throughout the several views. In this showing:

Figure 1 is an end elevational view of the brake unit mounted on a supporting frame through which a rotatable shaft extends and to which the braking action is to be applied, the shaft being shown in section and the dotted lines illustrating diagrammatically the location of some of the brake operating parts.

Figure 2 is a sectional view taken substantially on the line 2—2 of Figure 1.

Figure 3 is a sectional view taken substantially on the line 3—3 of Figure 1.

Figure 4 is a perspective view of a camming insert shown in section in Figure 3.

Figure 5 is an end elevational view similar to Figure 1 and illustrating a modified form of brake construction.

Figure 6 is a sectional view taken substantially on the line 6—6 of Figure 5.

Figure 10:
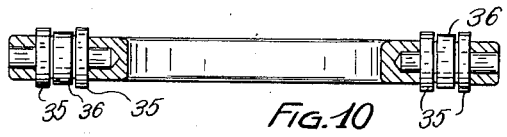
Figure 10 is a sectional view taken substantially on the line 10—10 of Figure 9.

Referring to Figures 1–6 of the drawings, the numeral 11 designates a supporting frame to which a brake housing 12 is secured by means of bolts 13. The supporting frame 11 may be a part of the frame of a vehicle, transmission casing, or any like structure carrying a rotatable shaft 14 to which it is desired to apply a braking force for retarding rotation of a shaft such as the shaft 14.

Within the housing 12, there is provided a relatively stationary braking disc 15 and a backing or energizer plate 16. The backing or energizer plate 16 may be secured to the housing 12 by means of bolts 17 as shown in Figure 2, or may be formed integrally with the housing 12 as shown in Figure 6.

Intermediate of the stationary disc 15 and the energizer plate 16, there is provided a relatively movable brake disc or pressure plate 18 which is mounted for a shifting movement axially of the housing and for limited rotational movement relative thereto for a purpose to be described.

Intermediate the stationary brake disc 15 and the axially movable brake disc 18, there is provided an annular rotary braking member 19. The braking member 19 has a splined connection with the shaft 14 so as to be rotatable therewith and shiftable axially with respect thereto.

Suitable annular braking elements 20 and 21 are mounted on the braking member 19 for respective engagement with the braking discs 15 and 18 upon movement of these parts into frictional engagement for applying a brake application to the rotatable shaft 14. Springs 22 are provided for resiliently biasing the brake disc 18 in a direction away from the stationary brake disc 15. In the construction shown in Figure 6, the springs 22 are directly positioned between the brake discs 15 and 18 whereas in the construction shown in Figure 2, a connecting device 23 is employed for maintaining the axially movable brake disc 18 in its released position. Indicated by the dotted lines in Figures 1 and 5, three of the springs 22 are employed but, it will be understood that the particular number, form, or location of the springs 22 may be varied as the circumstances required.

In the construction shown in Figure 2, the stationary brake disc 15 is provided with an annular flange 24 by which it is secured to the brake housing 12. The flange 24 is provided with internal threads for engagement with external threads formed on the energizer plate 16 which is secured to the brake housing 12. By reason of such threaded connection, it will be apparent that rotational movement of the flange 24 and disc 15 will effect an axial adjustment of the brake disc 15 to compensate for wear between the brake parts. To effect such axial adjustment, the flange 24 is provided with lugs 25 formed on the outer surface thereof and providing gripping elements for engagement with a suitable adjusting tool. An opening 26 is formed in the brake housing 12 through which the adjusting tool may be inserted, the edges of the opening 26 furnishing a fulcrum by which the adjusting tool may be used as a lever. A set screw 27 is provided for securing the brake disc 15 from rotatable and axial movement after a suitable adjustment has been made to the brake parts.

In the construction shown in Figures 5 and 6, the stationary brake disc 15 is secured directly to the brake housing 12 by a plurality of bolts 28. To provide servo or self energizing means for building up pressure on the axially movable brake disc or pressure plate 18, opposed camming disc inserts 29 and 30 are respectively mounted in the movable brake disc or pressure plate 18 and the energizer plate 16. The camming discs 29 and 30 are provided with V-shaped grooves furnishing camming surfaces engageable with a camming roller 31. Upon initial brake application, there will be a frictional drag on the axially movable brake disc or pressure plate 18 tending to rotate the same relative to the housing 12 and causing the camming roller 31 to ride up the camming surfaces of the camming discs 29 and 30. Such action will cam the brake disc 18 axially toward the stationary brake disc 15 and cause an additional pressure to be exerted thereupon in a manner well known in the art.

To prevent a binding action between the parts of the self energizing mechanism, it is desirable that the camming disc 30 be rotatably mounted in the axially movable pressure plate 8. It will be understood that the particular arrangement and number of the camming discs 29 and 30 and camming rollers 31 may be varied as the circumstances require.

In order to effect initial movement of the axial movable brake disc 18 into engagement with the rotary braking member 19, an annular operating member 32 is provided with suitable camming means.

Referring particularly to Figures 2, 3 and 4, the operating member 32 is provided with openings 33 and is provided with pins 34 extending transversely of the openings 33 and radially with respect to the shaft 14. A pair of actuating rollers 35 is rotatably mounted on the pin 34 and intermediate the rollers 35 is rotatably mounted a camming roller 36. A camming insert 37 having a camming surface 38 is mounted on the backing plate 16 for cooperation with the camming roller 36, one of the inserts 37 being provided for each camming roller 36. The actuating rollers 35 are engageable with the axial movable pressure plate 18 and upon rotation of the operating member 32 about the shaft 14, the camming rollers 36 will ride up the camming surface 38 of the inserts 37 and impart an axial camming movement to the rollers 35 for moving the pressure plate 18 into frictional engagement with the rotary braking member 19.

The operating member 32 is provided with extending projections 39 and 40 providing an opening therebetween for engagement with the flange operating collar 41. The collar 41 is mounted on a crank pin 42 secured to a crank arm 43. The crank arm 43 is connected to an operating shaft 44 rotatably mounted in the brake housing 12 and having a part thereof extending outwardly of the housing 12 for connection with an operating member 45. The operating member 45 may in turn be connected by suitable linkage to any form of conventional brake operating device. It will be apparent that upon actuation of the member 45, the shaft 44 will be rotated to impart a rotational movement to the operating member 32 for causing axial movement of the movable brake disc 18 into engagement with the braking member 19.

In Figures 5 and 6, there is shown a modified form of camming mechanism which comprises a stationary collar 46 secured to the energizer or backing plate 16 and a rotatably movable collar 47, the collars 46 and 47 being mounted on a flange 48 formed integrally with the backing plate 16. The collars 46 and 47 are provided with pairs of opposed conical recesses in which a frictionless camming ball 49 is receivable. Upon rotation of the collar 47 with respect to the collar 46, the collar 47 or operating member 47, will be cammed in a direction away from the backing plate 16. To transmit such axial camming member to the movable brake disc 18, there is provided anti-frictional ball bearings 50 between the collar 47 and the movable brake disc 18, an inner race 51 and an outer race 52 being provided for the frictionless ball bearings 50.

In the construction shown in Figures 5 and 6, the movable camming collar 47 is connected to the crank arm 43 by means of a link 53 in place of the connection provided by the elements 39, 40, 41 and 42 for the operating member 32 shown in Figures 1 and 2.

Figure 8:
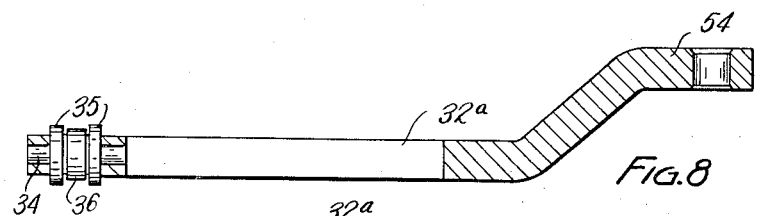
Figure 8 is a sectional view taken on the line 8—8 of Figure 7.
Figure 7:
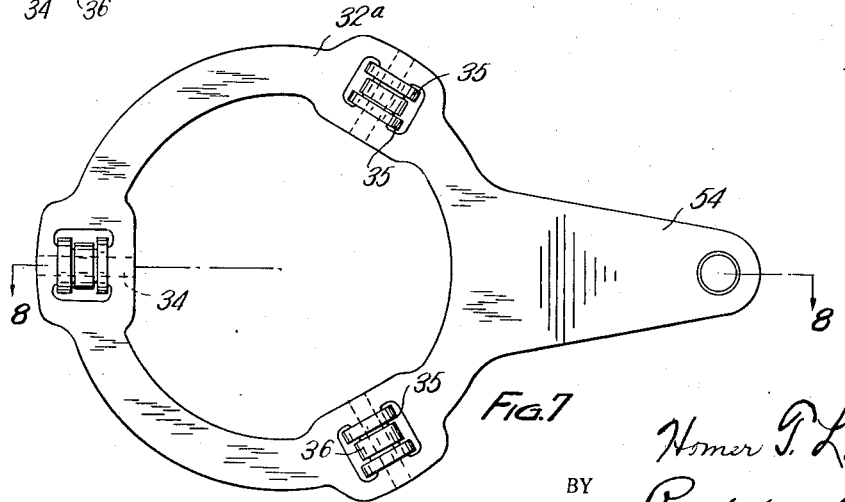
Figure 7 is a plan view of a modified form of brake operating member.

In Figures 7 and 8, there is shown a modified form of operating member 32a having an integral arm 54 projecting therefrom for connection to an operating link such as the link 53. By the modified form of operating member 32a, it will be understood that the same operating connections shown in Figures 5 and 6 may be employed in place of the operating connections 39, 40, 41, and 42, shown in Figures 1 and 2. The operating member 32a is provided with three sets of camming rollers 35 and 36 in the same manner as is employed in the operating member 32 shown in Figures 1 and 2. However, it will be understood that a greater or less number of camming rollers may be employed, if desired.

Figure 9:
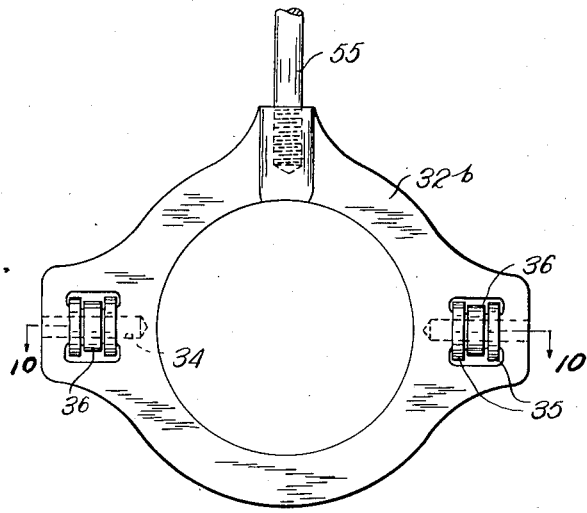
Figure 9 is a plan view of another modified form of brake operating member.

In Figures 9 and 10, there is shown a further modified form of operating member 32b. The operating members 32 and 32a have been described for constructions wherein such member is rotatable to effect a desired camming movement. However, it will be understood that the camming rollers 35 and 36 are equally well adapted to the operating member 32b which may be operated by imparting a reciprocating motion thereto, a suitable connection 55 being provided for effecting such reciprocating motion.

In the operation of the construction shown in Figures 1 and 2 and the construction shown in Figures 5 and 6, the actuating member 45 is moved to effect the desired camming movement of the axially movable brake disc 18 into initial frictional engagement with the rotary braking member 19. Such frictional engagement will exert a drag on the movable brake disc 18 which will rotate the same relative to the brake housing 12 and bring into action the self energizing effect of the camming rollers 31 to build up an additional braking pressure on the axially movable brake disc 18.

It will be apparent that the operation of the self energizing means through the camming roller is dependent upon the relative rotational movement of the axially movable brake disc 18. Accordingly, it will also be apparent that it is desirable to prevent the camming means comprising the member 47 or the operating member 32 from exerting a binding or freezing action on the axially movable pressure plate 18 upon operation thereof to move the pressure plate 18 into initial frictional engagement. Such binding or freezing action would prevent or interfere with relative rotation of the member 18 with respect to the brake housing 12 and incident automatic operation of the servo or self energizing means for building up an additional pressure on the axially movable brake disc 18.

From the foregoing construction, it will be apparent that this invention provides an effective means for axially camming the movable brake disc 18 into engagement with the rotary braking member 19 and which will not interfere with relative rotational movement of the brake disc 18. In the constructions employing the camming rollers 36 and the actuating rollers 35, it will be apparent that the actuating rollers 35 are rollably engageable with the surface of the movable brake disc or pressure plate 18. Accordingly, there will be no frictional engagement or binding action between the actuating rollers 35 and the plate 18, the plate 18 thereby being permitted to rotate relatively to the brake housing 12 to permit incident operation of the servo or self energizing means upon such relative rotation. Similarly, in the construction illustrated in Figures 5 and 6 and employing the camming operating member 47, the parts 50, 51 and 52 will be effective to impart axial camming movement to the axially movable brake disc 18 and permit free relative rotation of the axially movable brake disc 18 with respect to the housing 12 and incident operation of the servo or self energizing means.

Having thus described my invention, what I claim as new and desire to secure by Letters Patent of the United States, is:

1. Brake mechanism of the class described comprising in combination, a housing, a rotary braking disc mounted therein, a pressure plate shiftable axially of said housing into frictional contact with said disc to produce a braking action, said pressure plate being mounted for limited rotational movement relative to said housing on movement into engagement with said braking disc, and actuating means for shifting said pressure plate axially comprising an operating member, actuating rollers mounted on said operating member and engageable with said pressure plate, camming rollers mounted on said operating member, camming members occupying a fixed position with respect to said housing, connections for actuating said operating member to move said camming rollers with respect to said camming members to impart an axial camming movement to said actuating rollers and said pressure plate for moving said pressure plate axially into frictional contact with said braking disc, the engagement of said actuating rollers with said pressure plate permitting free rotational movement of said pressure plate relative to said housing.

2. Brake mechanism as claimed in claim 1 wherein said connections comprise a shaft rotatably mounted in said housing, a crank arm secured to said shaft within said housing, means connecting said crank arm to said operating member, and an actuating device connected to said shaft outside said housing for imparting a rotational movement thereto to actuate said operating member.

3. Brake mechanism as claimed in claim 1 wherein said connections comprise a shaft rotatably mounted in said housing, a crank arm having an actuating member thereon, secured to said shaft within said housing, said operating member being provided with a slot having edge surfaces engageable with said actuating member for movement thereby upon rotation of said shaft, and an actuating device connected to said shaft outside said housing for imparting a rotational movement thereto.

4. Brake mechanism of the class described comprising in combination, a housing, an energizer plate secured to said housing, a relatively stationary brake disc mounted on said energizer plate, a relatively movable brake disc intermediate said stationary brake disc and said energizer plate, a rotary brake member to be braked between said brake discs, means for shifting said movable brake plate axially into engagement with said brake member to produce a braking action, said stationary brake disc being provided with a flange having a threaded connection with said energizer plate permitting axial adjustment of said stationary plate upon rotation thereof with respect to said energizer plate, and a plurality of projections on said flange for assisting in effecting adjustable turning movement of said plate, said housing having an opening opposite said projections permitting ready access thereto.

5. Brake mechanism of the class described comprising in combination, a housing, an energizer plate secured to said housing, a relatively stationary brake disc mounted on said energizer plate, a relatively movable brake disc intermediate said stationary brake disc and said energizer plate, a rotary brake member to be braked between said brake discs, means for shifting said movable brake plate axially into engagement with said brake member to produce a braking action, said movable brake disc being mounted for limited rotation with respect to said housing, self energizing means intermediate said energizer plate and said movable brake disc for producing axial pressure upon said movable brake disc upon rotational movement of said movable brake disc, said shifting means comprising an annular operating member having camming rollers thereon, camming disc inserts mounted in a fixed position with respect to said housing and having camming surfaces cooperable with said camming rollers, means for moving said operating member to cause said camming rollers to ride up said camming surfaces to impart an axial camming movement to said camming rollers, actuating rollers connected to said camming rollers and engageable with said movable brake disc to transmit thereto said axial camming movement, said actuating rollers being operable to engage said movable brake disc with a rolling action permitting free rotational movement thereof with respect to said housing and incident operation of said self-energizing means.

6. Brake mechanism of the class described comprising in combination, a housing, an energizer plate secured to said housing, a relatively stationary brake disc mounted on said energizer plate, a relatively movable brake disc intermediate said stationary brake disc and said energizer plate, a rotary brake member to be braked between said brake discs, means for shifting said movable brake plate axially into engagement with said brake member to produce a braking action, said movable brake disc being mounted for limited rotation with respect to said housing, self energizing means intermediate said energizer plate and said movable brake disc for producing axial pressure upon said movable brake disc upon rotational movement of said movable brake disc, said shifting means comprising an annular operating member, camming means for imparting an axial camming movement to said operating member, and motion transmitting means intermediate said operating member and said movable brake disc for transmitting axial movement of said operating member to said movable brake disc including anti-frictional bearings operative to permit free rotation of said movable brake disc relative to said housing and incident operation of said self energizing means.

HOMER T. LAMBERT.